(12) United States Patent
Arnott

(10) Patent No.: US 8,353,638 B2
(45) Date of Patent: Jan. 15, 2013

(54) ADAPTER FOR MOUNTING ROTARY LOAD ON MOTOR FLYWHEEL HOUSING

(75) Inventor: Bob Arnott, Grassington Nr Skipton (GB)

(73) Assignee: Centa-Antriebe Kirschey GmbH, Haan (DE)

(*) Notice: Subject to any disclaimer, the term of this patent is extended or adjusted under 35 U.S.C. 154(b) by 1723 days.

(21) Appl. No.: 11/372,491

(22) Filed: Mar. 9, 2006

(65) Prior Publication Data

US 2006/0202570 A1    Sep. 14, 2006

(30) Foreign Application Priority Data

Mar. 10, 2005  (DE) .......................... 10 2005 011 528

(51) Int. Cl.
*F16D 13/58* (2006.01)

(52) U.S. Cl. .......................................................... 403/3

(58) Field of Classification Search .............. 403/408.1, 403/410, 3, 11, 13, 14; 248/676, 678, 911, 248/912

See application file for complete search history.

(56) References Cited

U.S. PATENT DOCUMENTS

| | | | | |
|---|---|---|---|---|
| 3,361,482 A * | 1/1968 | Stevens | .................... | 301/35.629 |
| 3,432,705 A * | 3/1969 | Lindtveit | ........................ | 310/91 |
| 3,459,455 A * | 8/1969 | Penniman, Jr. et al. | ........ | 301/9.1 |
| 3,580,367 A * | 5/1971 | McCarthy | ................. | 188/206 R |
| 3,667,128 A * | 6/1972 | Morgan | ........................... | 33/529 |
| 3,814,887 A * | 6/1974 | Cleaveland | ................... | 200/554 |
| 4,478,593 A * | 10/1984 | Brown | .......................... | 464/182 |
| 4,718,468 A * | 1/1988 | Cowman | ..................... | 144/154.5 |
| 5,028,068 A * | 7/1991 | Donovan | ....................... | 280/618 |
| 5,096,405 A * | 3/1992 | Pace et al. | ................. | 425/192 R |
| 5,203,441 A * | 4/1993 | Monette | ......................... | 192/112 |
| 5,366,312 A * | 11/1994 | Raines | .............................. | 403/3 |
| 5,566,591 A * | 10/1996 | Burkett | ......................... | 74/606 R |
| 5,577,755 A * | 11/1996 | Metzger et al. | ............... | 280/607 |
| 5,988,326 A * | 11/1999 | Sommer | ....................... | 188/71.5 |
| 6,022,040 A * | 2/2000 | Buzbee | ......................... | 280/613 |
| 6,203,051 B1* | 3/2001 | Sabol | ............................. | 280/607 |
| 6,209,212 B1* | 4/2001 | Uchida et al. | ................... | 33/412 |
| 6,299,078 B1* | 10/2001 | Fugere | .......................... | 239/591 |
| 6,761,541 B1* | 7/2004 | Clendenin | ..................... | 417/360 |
| 6,916,036 B1* | 7/2005 | Egli | ................................. | 280/618 |
| 2004/0149033 A1* | 8/2004 | Hansen | .......................... | 73/487 |

FOREIGN PATENT DOCUMENTS

| | | |
|---|---|---|
| DE | 41 34 369 | 4/1992 |
| EP | 0 515 929 | 12/1992 |

* cited by examiner

*Primary Examiner* — Joshua Kennedy
(74) *Attorney, Agent, or Firm* — Andrew Wilford

(57) ABSTRACT

An adapter for fitting a flywheel housing to a rotary load has a generally circular centering plate having a central circular aperture dimensioned to fit snugly around the load's collar and a circular outer periphery. The centering plate is formed with first and second arrays of holes equispaced from a center of the aperture. The first-array holes are spaced identically to and alignable with fastening formations of the load. An adapter plate engaged flatly with the centering plate is formed with a first array of at least two holes spaced identically to and alignable with the formations, and is stiffened. Respective fasteners are engageable, when the first-array holes of both plates are aligned with the formations of the load, through the adapter plate, centering plate, and fastener formations. The second-array holes of the circular centering plate are covered by the adapter plate when the plates are thus fastened together.

11 Claims, 5 Drawing Sheets

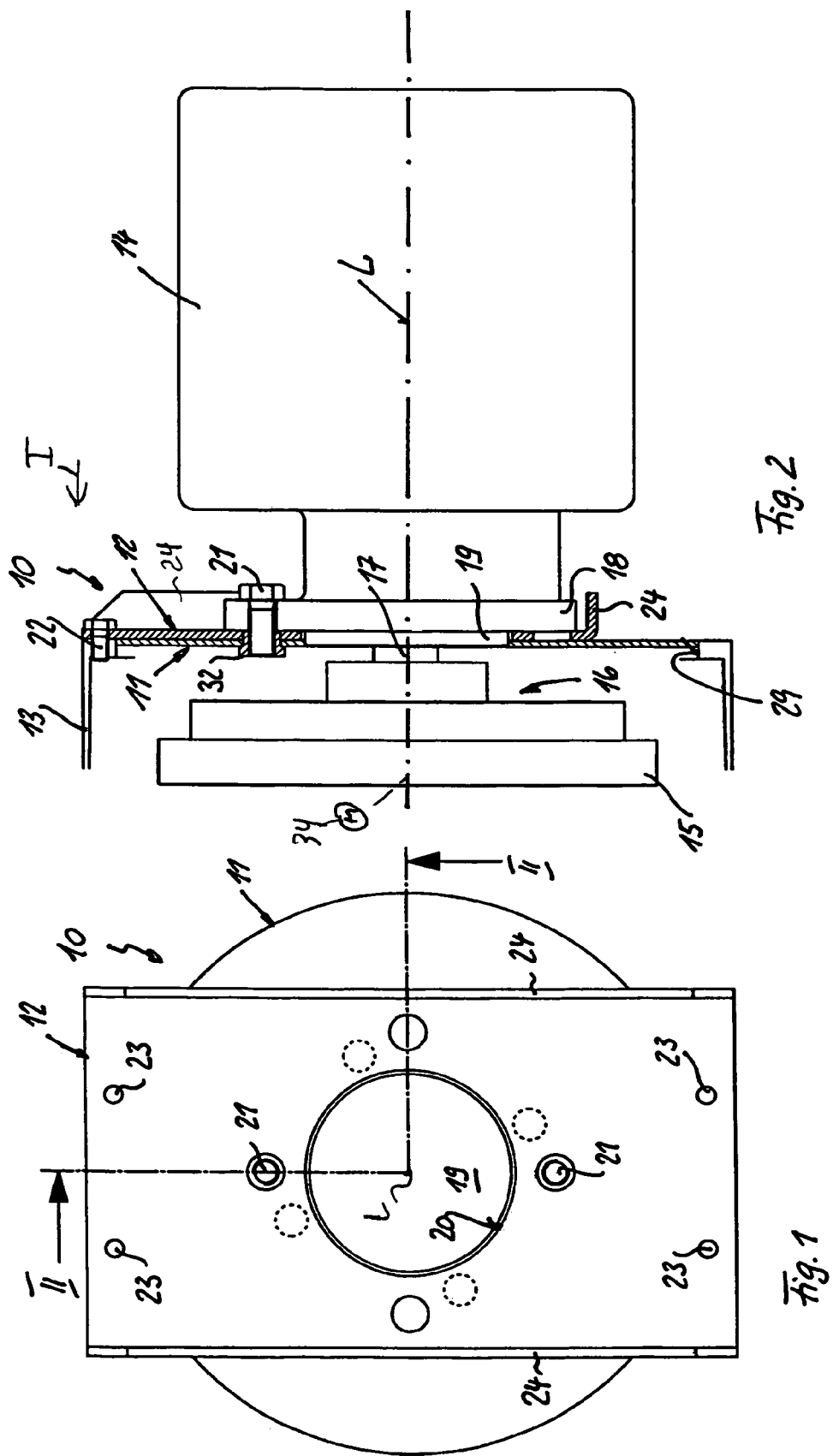

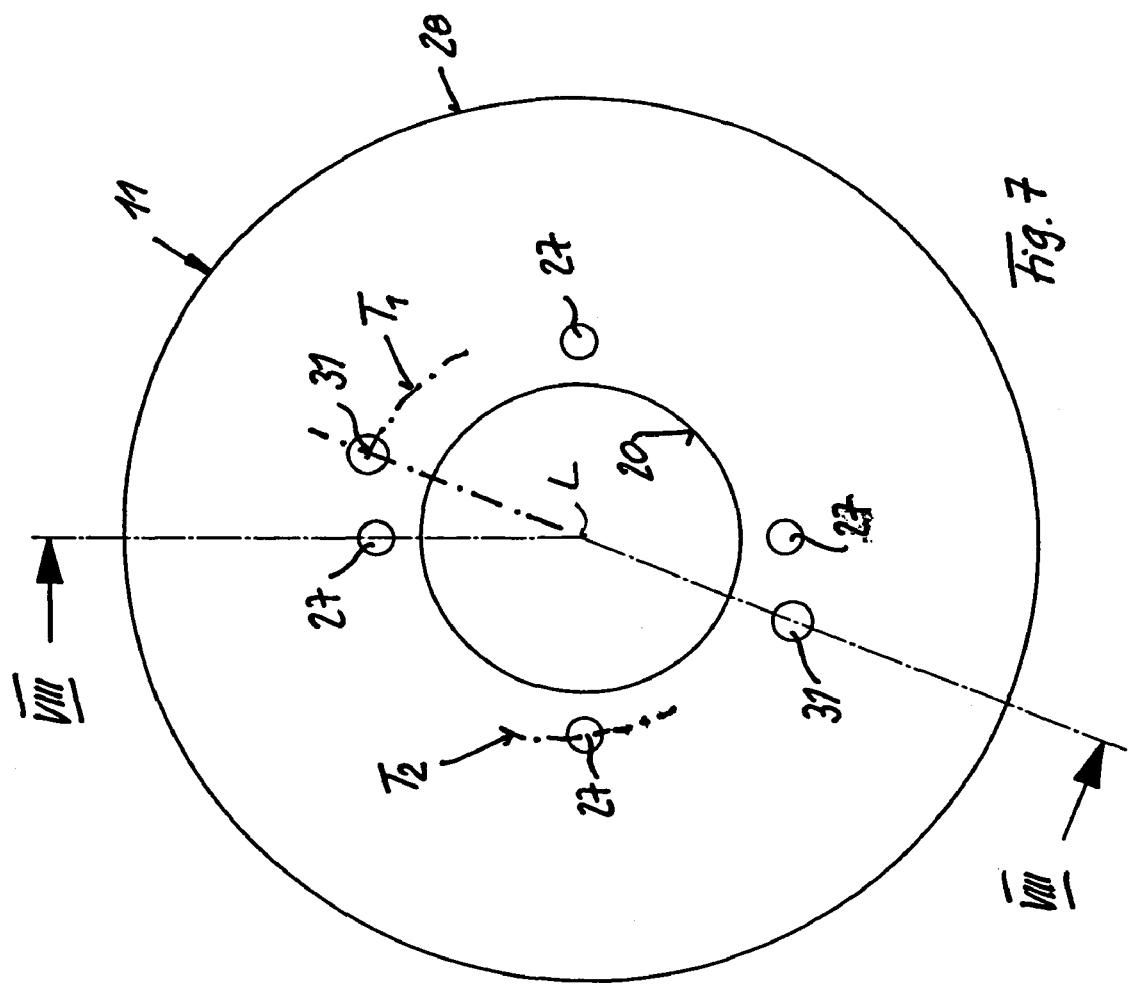

ADAPTER FOR MOUNTING ROTARY LOAD ON MOTOR FLYWHEEL HOUSING

FIELD OF THE INVENTION

The present invention relates to an adapter. More particularly this invention concerns an adapter for mounting a rotary load, e.g. a hydraulic pump, on a flywheel housing of a motor or engine.

BACKGROUND OF THE INVENTION

It is frequently necessary to connect a motor or engine with a variety of different loads, for instance, pumps, and to have to change out the motor or the load at some time, often with one of a different design or manufacturer. Thus it is necessary to mount the relatively massive load so that its input shaft is as perfectly as possible aligned with the motor or engine's output shaft, typically formed by a flywheel.

The standard system is to provide a relatively massive cast or machined plate that on the one side fits with and can be bolted to the output side of the flywheel housing and on the other side fits with and can be bolted to the flange surrounding the input shaft of the load. Such a part is quite expensive to manufacture and must be designed for a specific type or style of motor or load, making it practically a custom item. When made of cast steel, as is common, it has a thickness of 12 mm to 16 and must be meticulously machined. Such an arrangement is shown in EP 0,515,929 of Hertell and German 4,134,369 of Maier.

Even though it is standard to make the loads with a standardized input side, typically a flange having bolt holes at a predetermined spacing flanking a central collar of predetermined diameter surrounding the input shaft, it is necessary to provide a special adapter for each standardized type. Some pump flanges have two bolt holes, and some have four, so that when a multiply drilled adapter is provided to accommodated both types, the result is open passages through the adapter that must be plugged when not used.

OBJECTS OF THE INVENTION

It is therefore an object of the present invention to provide an improved adapter for connecting a flywheel to a rotary load.

Another object is the provision of such an improved adapter for connecting a flywheel to a rotary load that overcomes the above-given disadvantages, in particular that is of simple and inexpensive construction, that can be used with different types of loads, and that does not leave leak passages in any installation.

SUMMARY OF THE INVENTION

A rotary load has a face, a small-diameter cylindrical collar projecting from the face and centered on a motor axis, and at least two fastener formations on the face equispaced from the axis. A flywheel housing has a large-diameter circular rim centered on a flywheel axis. An adapter has according to the invention a generally circular centering plate having a central circular aperture dimensioned to fit snugly around the collar and a circular outer periphery. The centering plate is formed with first and second arrays of holes equispaced from a center of the aperture. The first-array holes are spaced identically to and alignable with the formations. An adapter plate engaged flatly with the centering plate is formed with a first array of at least two holes spaced identically to and alignable with the formations, and is stiffened. Respective fasteners are engageable, when the first-array holes of both plates are aligned with the formations of the load, through the adapter plate, centering plate, and fastener formations. The second-array holes of the circular centering plate are covered by the adapter plate when the plates are thus fastened together.

Thus this arrangement is formed by two simple plates that can be made cheaply of sheet steel. The centering plate is designed for the flywheel housing and can have two or more arrays of mounting holes. This centering plate can be relatively light because it primarily serves to transmit torque in its plane and is solidly secured along at least its inner and outer peripheries. The adapter plate is designed for the rotary load, e.g. a hydraulic pump, and can have only one set of holes for the particular pump or several sets to accommodate different pumps. This adapter plate is fairly stiff so that it serves not so much for transmitting torque, but for accurately positioning the motor on the flywheel housing. Even so, the adapter plate can also be a relatively inexpensive sheet-steel plate.

With this system the two plates can be supplied separately and assembled flatly together by the end user, or they can be fixed together at the factory. The separation of the functions, the one plate being designed for the flywheel housing and serving to transmit torque and the adapter plate being designed for the load and serving to support this load, makes it easy to provide adapters for all different kinds of assemblies without having to stock a specific adapter for each possible combination. Thus assuming by way of example that there are four different centrifuge housings and four different pumps, it is not necessary to manufacture sixteen different adapters, but only four centering plates and four adapter plates.

According to the invention means is provided for securing the centering plate to the flywheel housing with the rim of the housing fitting around the outer periphery of the centering plate. This means can be bolts. In a situation where the adapter plate has an overall length greater than a diameter of the outer periphery, the adapter plate can be bolted to the centrifuge housing outside the outer periphery of the centering plate.

The means for stiffening the adapter plate can include bent-up edge flanges of the adapter plate extending secantally across the centering plate. Alternately, the adapter plate can be made of thicker material.

The first-array holes of the centering plate are according to the invention at a predetermined spacing from the axis, and the second-array holes of the centering plate are at a predetermined but different spacing from the axis. Thus they lie on different circles centered on the axis. The adapter plate in accordance with the invention also has a second array of holes separate from the first array of adapter-plate holes and spaced angularly from the first-array adapter-plate holes. These second-array holes of the adapter plate are spaced identically to and alignable with the second-array centering-plate holes. Furthermore the holes of the first and second arrays of both plates are relatively spaced such that, when the first-array holes of both plates are axially aligned. The plates axially block each other's second-array holes, and when the second-array holes of both plates are axially aligned. The plates axially block each other's first-array holes. Thus there is no need to provide separate means for plugging unused holes.

In a specific arrangement the first arrays each have two diametrally opposite holes and the second arrays each have four angularly equispaced holes. The first-array holes are offset by other than 45° from the respective second-array holes, e.g. 22.5° in one direction and 67.5° in the other.

Threaded bolt anchors in at least some of the holes secure the two plates together.

BRIEF DESCRIPTION OF THE DRAWING

The above and other objects, features, and advantages will become more readily apparent from the following description, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing:

FIG. 1 is an end view taken in the direction of arrow I of FIG. 2 of the adapter according to the invention;
FIG. 2 is a section taken along line II-II of FIG. 1;
FIG. 7 is an end view of the centering plate according to the invention;
FIG. 8 is a section along lines VIII-VIII of FIG. 7;
FIG. 10 is a section along lines X-X of FIG. 9.

SPECIFIC DESCRIPTION

Figure 4:
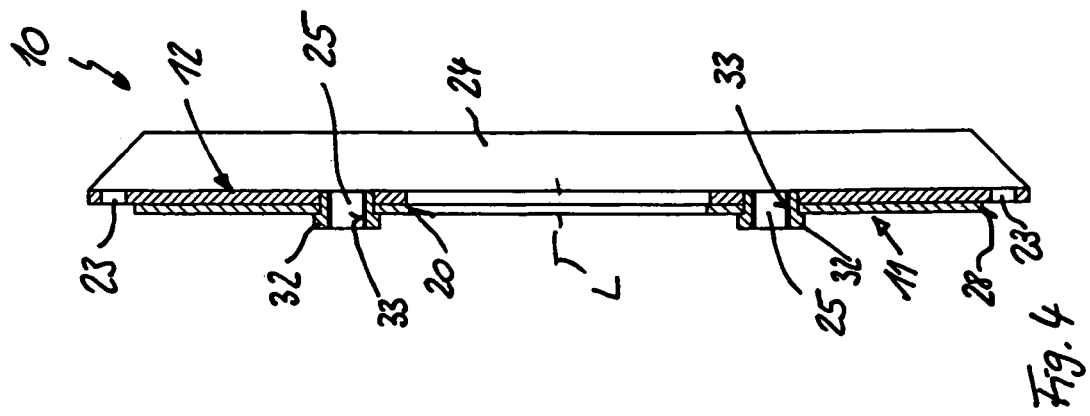
FIG. 4 is a section along line IV-IV of FIG. 3.
Figure 3:
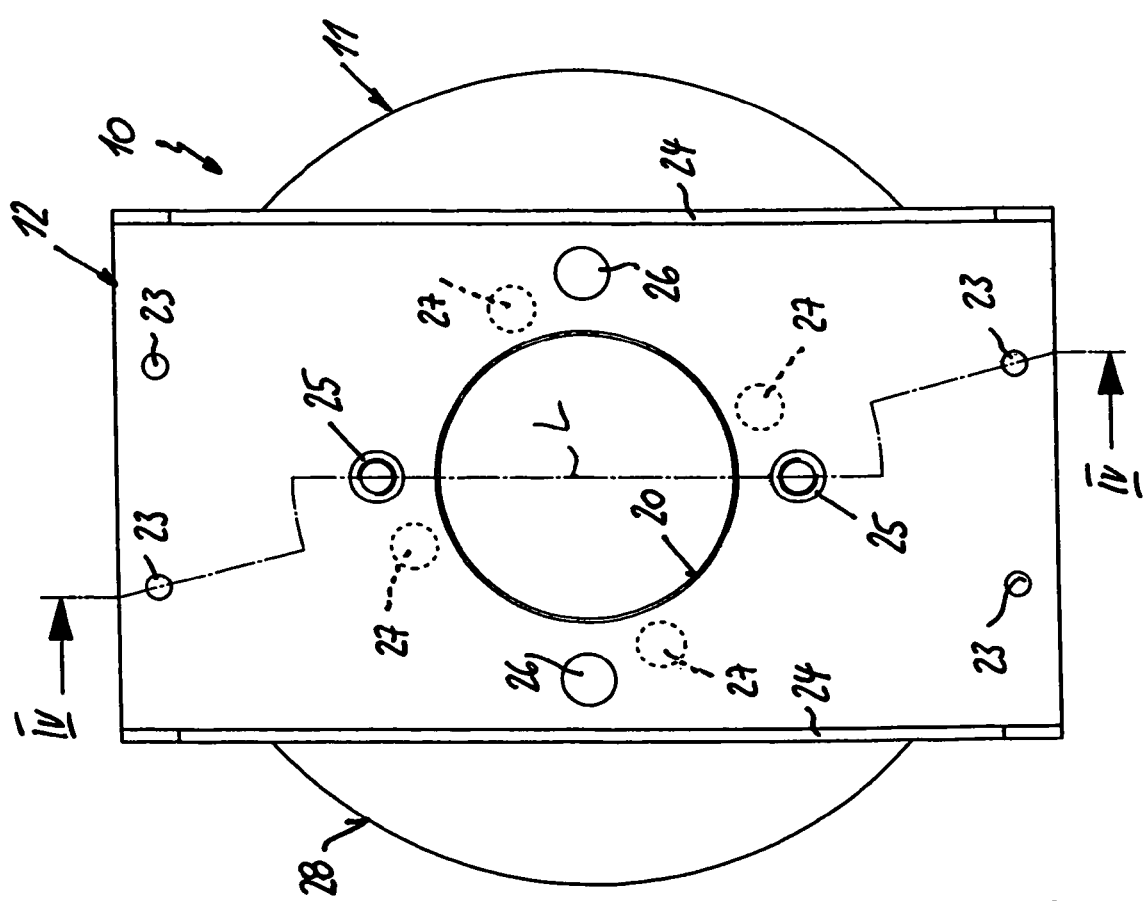
FIG. 3 is a view like FIG. 1 but in somewhat larger scale.
Figure 6:
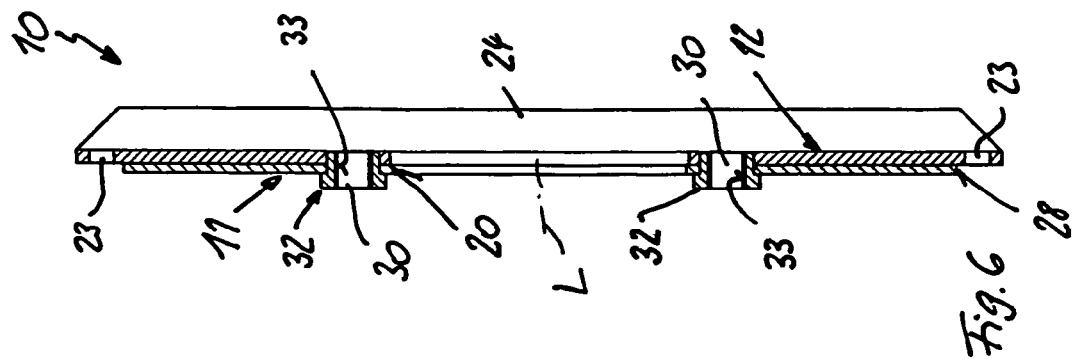
FIG. 6 is a section along line VI-VI of FIG. 5.

As seen in FIGS. 1 to 4 an adapter 10 according to this invention basically comprises a sheet-steel centering plate 11 and a sheet-steel adapter plate 12. A flywheel housing 13 of cylindrical shape and centered on an axis L holds a flywheel 15 rotated about the axis L by a motor indicated schematically at 34. A load 14, here a hydraulic pump, has an end flange 18 and a drive shaft 17 both centered on the axis L. The shaft 17 is connected by an elastic coupling 16 to the flywheel 15. This flange 18 has a raised cylinder collar 19 centered on the axis L.

The plates 11 and 12 are both formed with identical circular holes 20 that are accurately machined to fit snugly complementarity over the collar 19. Bolts 21 diametrically flanking the axis L extend through the flange 18 through first-array holes 25 and 31 of the plates 12 and 11, respectively, and are threaded into collars 32 seated in the plate 11 so as to lock the load 14 coaxial with the flywheel 15. In addition the centering plate 11 has an accurately machined circular or cylindrical outer periphery 28 fitting snugly within a circular rim 29 of the flywheel housing 13. Four bolts 22, two to each side of the axis L, pass through holes 23 in the adapter plate 10 and are seated in the housing 13, passing outside the outer periphery 28 of the centering plate 11. The bolts 21 are seated in anchor sleeves 32 set in the centering plate 11 and having holes 30 formed with screwthreads 33 allowing the bolts 21 to be easily screwed in place.

The circular centering plate 11 is made of relatively light sheet metal. The rectangular adapter plate 12, however, is much more rigid, being made of thicker sheet steel and being formed along its two longitudinal edges with bent-out 90° flanges 24 that impart considerable stiffness to it. The plate 12 is longer than the diameter of the plate 11 so that it bears directly on the flange 13 and solidly hangs the pump 14. The two plates 11 and 12 can be joined together at the factory, e.g. by the anchor sleeves 30 or spot welding, for a premade adapter 10, or can be provided separate so that they are only flatly engaged with each other when the bolts 21 and 22 are set.

In addition to the diametrically opposite holes 25 in the plate 12 through which pass the bolts 21, the plate 12 is formed with two other diametrically opposite first-array holes 26 equispaced with the holes 25 and lying on a common large-diameter circle $T_1$ centered on the axis L. Between the holes 25 and 26, the plate 12 is formed with four second-array holes 30 that are angularly equispaced, interleaved with the holes 25 and 26, and that lie on a smaller-diameter circle $T_2$ centered on the axis L.

Furthermore, the plate 11 is formed with four more angularly equispaced second-array holes 27 set on the smaller diameter circle $T_2$ centered on the axis L and equispaced at 90° about the axis L. The first- and second-array holes, 25, 26 and 30 are thus all angularly equispaced at 45°.

Figure 5:
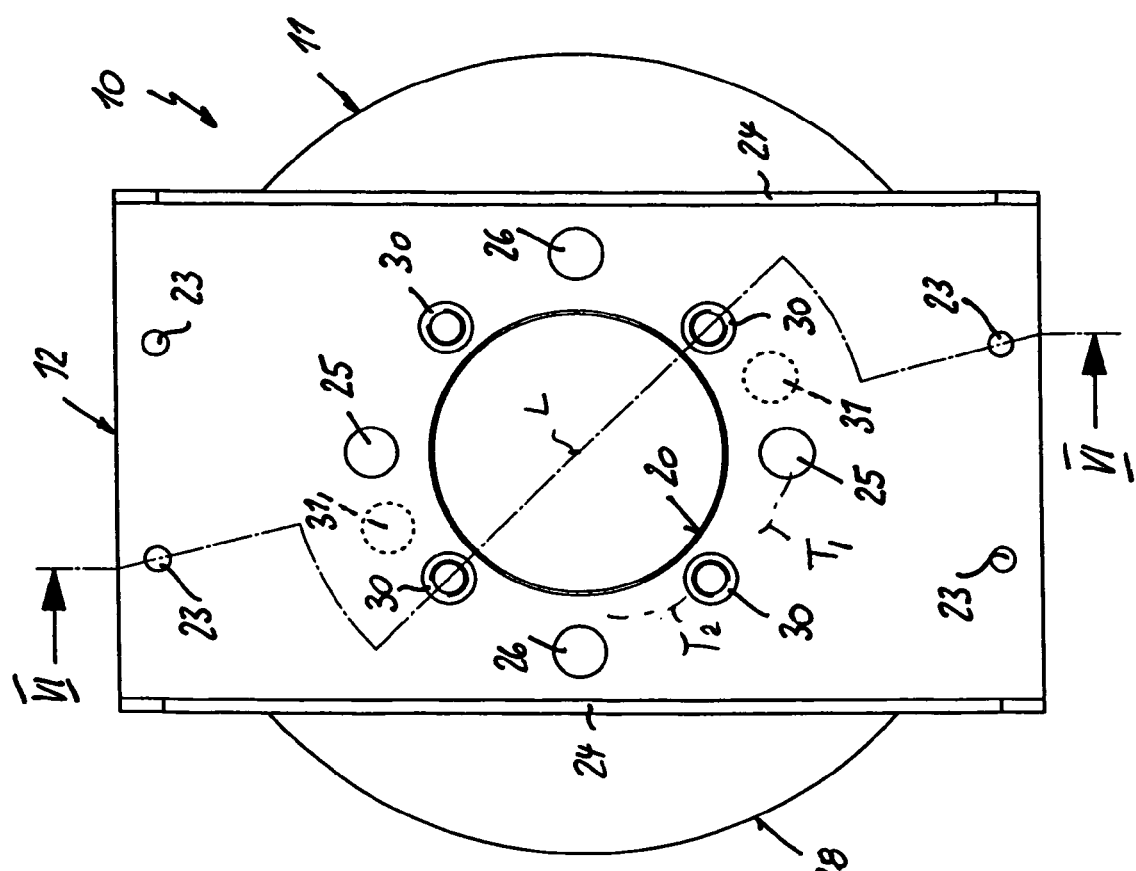
FIG. 5 is a view like FIG. 1 of another adapter according to the invention.
Figure 16:
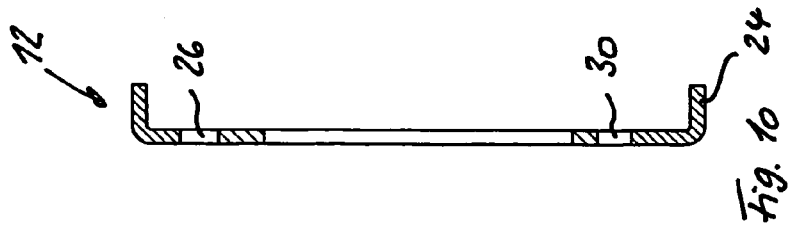
Figure 9:
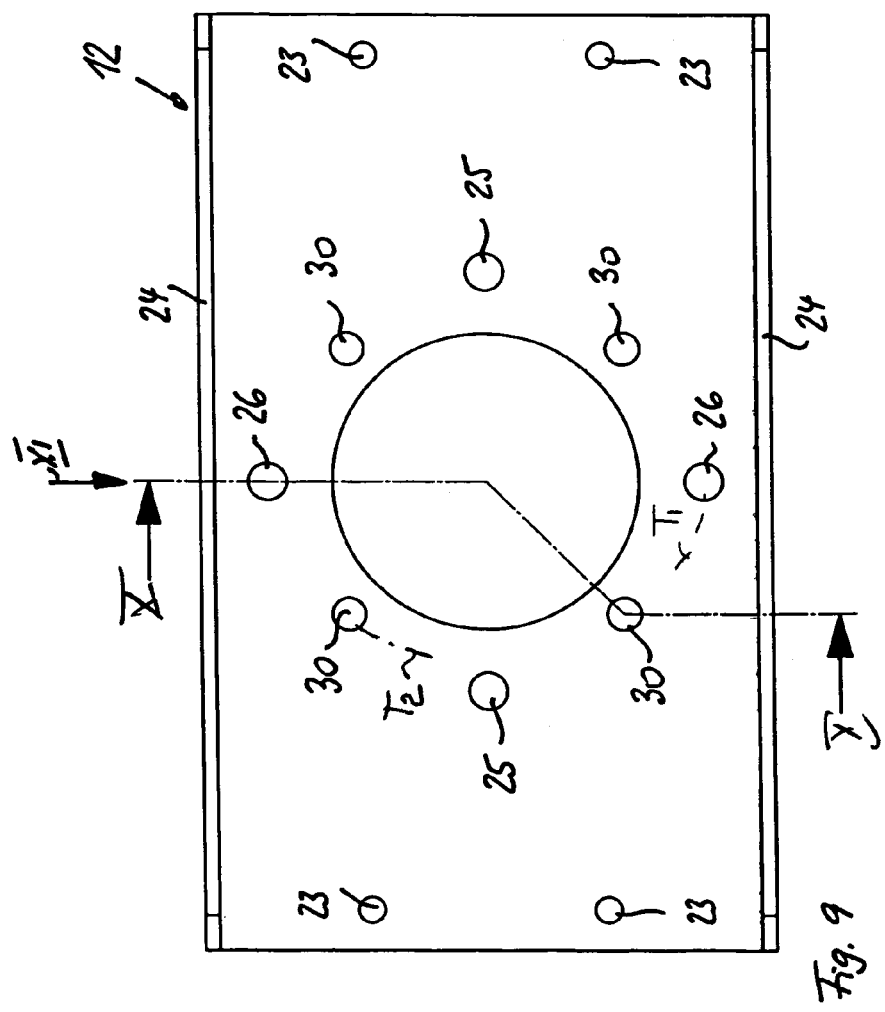
FIG. 9 is an end view of the adapter plate according to the invention.
Figure 11:
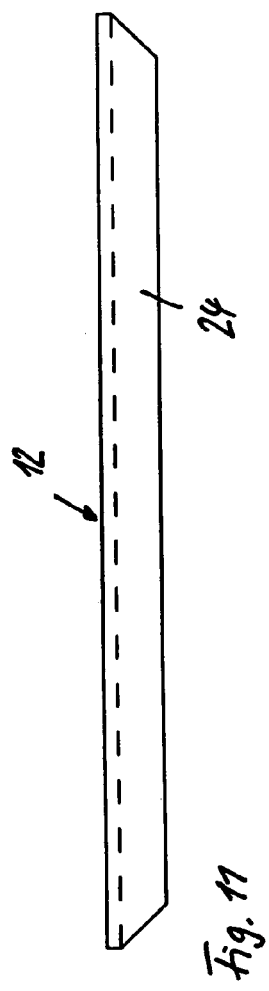
FIG. 11 is a side view taken in the direction of arrow XI of FIG. 9.

FIG. 7 shows how the centering plate 11 is also formed with the two first-array holes 31 alignable with the two first-array holes 25 to 26 and lying on the outer circle $T_1$. Each hole 31 is spaced more closely to one of the adjacent second-array holes 27 than to the other, in fact being offset from 22.5° to the other and 67.5° from the other as shown by a comparison of FIGS. 3 and 5. The considerable advantage of this is that the centering plate 11 and adapter plate 12 can be used with two completely different types of motor. One type of motor will be secured at the holes 25 to 26. In this position, the other holes 30 of the adapter plate 12 will be blocked by the plate 11. When used with another type of motor using two or more bolts and fitting through the inner holes 30 and 27, the holes 25 and 26 will similarly be blocked by the adapter plate 12, preventing any leakage therethrough.

I claim:
1. In combination:
a rotary load having a face, a small-diameter cylindrical collar projecting from the face and centered on a motor axis, a rotatable shaft centered on the axis, and at least two fastener formations on the face radially equispaced from the axis;
a flywheel rotatable about the axis and juxtaposed with the face;
a coupling between the flywheel and the shaft rotationally joining same together;
a nonrotatable flywheel housing surrounding the flywheel and having a large-diameter circular rim centered on a flywheel axis;
a generally circular centering plate having a central circular aperture dimensioned to fit snugly around the collar and a circular outer periphery, the centering plate being formed with first and second arrays of holes equispaced from a center of the aperture, the first-array holes being spaced identically to and alignable with the formations, the second-array holes being spaced from the axis differently from the first-array holes;
an adapter plate engaged flatly with the centering plate and formed with a first array of at least two holes spaced identically to and alignable with the formations and with a second array of at least two holes spaced from the axis the same as the second-array holes of the centering plate;
means for stiffening the adapter plate; and
respective fasteners engageable, when the holes of the first arrays of both plates are aligned with the formations of the load, through the adapter plate, centering plate, and fastener formations, the second-array holes of the circular centering plate being covered by the adapter plate when the plates are thus fastened together.

2. The combination defined in claim 1, further comprising means for securing the centering plate to the flywheel housing with the rim of the housing fitting around the outer periphery of the centering plate.

3. The combination defined in claim 2 wherein the adapter plate has an overall length greater than a diameter of the outer periphery of the centering plate.

4. The combination defined in claim 1 wherein both plates are of sheet steel.

5. The combination defined in claim 1 wherein the fasteners are bolts.

6. The combination defined in claim 1 wherein the holes of the first and second arrays of both plates are relatively spaced such that, when the first-array holes of both plates are axially aligned, the plates axially block each other's second-array holes, and when the second-array holes of both plates are axially aligned, the plates axially block each other's first-array holes.

7. The combination defined in claim 1 wherein the first arrays each have two diametrally opposite holes and the second arrays each have four angularly equispaced holes.

8. The combination defined in claim 7 wherein the first-array holes are offset by other than 45° from the respective second-array holes.

9. The combination defined in claim 1, further comprising threaded bolt anchors in at least some of the holes.

10. In combination:
a rotary load having a face, a small-diameter cylindrical collar projecting from the face and centered on a motor axis, a rotatable shaft centered on the axis, and at least two fastener formations on the face radially equispaced from the axis;
a flywheel rotatable about the axis and juxtaposed with the face;
a coupling between the flywheel and the shaft rotationally joining same together;
a nonrotatable flywheel housing surrounding the flywheel and having a large-diameter circular rim centered on a flywheel axis;
a generally circular centering plate having a central circular aperture dimensioned to fit snugly around the collar and a circular outer periphery, the centering plate being formed with first and second arrays of holes equispaced from a center of the aperture, the first-array holes being spaced identically to and alignable with the formations, the second-array holes being spaced from the axis differently from the first-array holes;
an adapter plate engaged flatly with the centering plate and formed with a first array of at least two holes spaced identically to and alignable with the formations and with a second array of at least two holes spaced from the axis the same as the second-array holes of the centering plate;
bent-up edge flanges of the adapter plate extending secantally across the centering plate for stiffening the adapter plate; and
respective fasteners engageable, when the holes of the first arrays of both plates are aligned with the formations of the load, through the adapter plate, centering plate, and fastener formations, the second-array holes of the circular centering plate being covered by the adapter plate when the plates are thus fastened together.

11. In combination:
a rotary load having a face, a small-diameter cylindrical collar projecting from the face and centered on a motor axis, a rotatable shaft centered on the axis, and at least two fastener formations on the face radially equispaced from the axis;
a flywheel rotatable about the axis and juxtaposed with the face;
a coupling between the flywheel and the shaft rotationally joining same together;
a nonrotatable flywheel housing surrounding the flywheel and having a large-diameter circular rim centered on a flywheel axis;
a generally circular centering plate having a central circular aperture dimensioned to fit snugly around the collar and a circular outer periphery, the centering plate being formed with first and second arrays of holes equispaced from a center of the aperture, the first-array holes being spaced identically to and alignable with the formations, the second-array holes being spaced from the axis differently from the first-array holes;
an adapter plate engaged flatly with the centering plate and formed with a first array of at least two holes spaced identically to and alignable with the formations and with a second array of at least two holes spaced from the axis the same as the second-array holes of the centering plate, the holes of the first and second arrays of both plates being relatively spaced such that, when the first-array holes of both plates are axially aligned, the plates axially block each other's second-array holes, and when the second-array holes of both plates are axially aligned, the plates axially block each other's first-array holes;
means for stiffening the adapter plate; and
respective fasteners engageable, when the holes of the first arrays of both plates are aligned with the formations of the load, through the adapter plate, centering plate, and fastener formations, the second-array holes of the circular centering plate being covered by the adapter plate when the plates are thus fastened together.

* * * * *